United States Patent

[11] 3,537,473

[72] Inventor David B. DeZurik, Jr.
 Saint Cloud, Minnesota
[21] Appl. No. 795,601
[22] Filed Jan. 31, 1969
[45] Patented Nov. 3, 1970
[73] Assignee DeZurik Corporation
 Sartell, Minnesota
 a corporation of Minnesota

[54] ANTI SLAM VALVE POSITIONING MEANS
 6 Claims, 3 Drawing Figs.
[52] U.S. Cl. .................................................. 137/556.6,
 137/385, 251/96, 251/101, 251/102, 251/285,
 251/288, 251/297
[51] Int. Cl. ..........................................F16k 37/00,
 F16k 1/22, F16k 35/04
[50] Field of Search........................................... 137/383,
 384.2, 385, 556.6; 251/95—102, 110, 285—288,
 297, 309

[56] References Cited
 UNITED STATES PATENTS
| 1,754,198 | 4/1930 | DuBois | 251/111X |
| 2,665,107 | 1/1954 | Blackford | 251/96 |
| 3,170,669 | 2/1965 | Roos | 251/297X |
| 3,228,415 | 1/1966 | Geiss | 137/385 |
| 3,355,141 | 11/1967 | Cooper | 251/101 |
| 3,460,800 | 8/1969 | Mikuls | 251/288X |

Primary Examiner—Henry T. Klinksiek
Attorney—Wolfe, Hubbard, Leydig, Voit and Osann ABSTRACT: A positioning means for the flow control member of a rotatable valve is described in which the valve actuating lever carries a threaded shaft which is tightenable against a friction plate mounted on the valve body. The surface of the friction plate is eccentric to the valve stem so that the shaft must be progressively untightened to allow the valve to move toward the closed position.

Patented Nov. 3, 1970
3,537,473
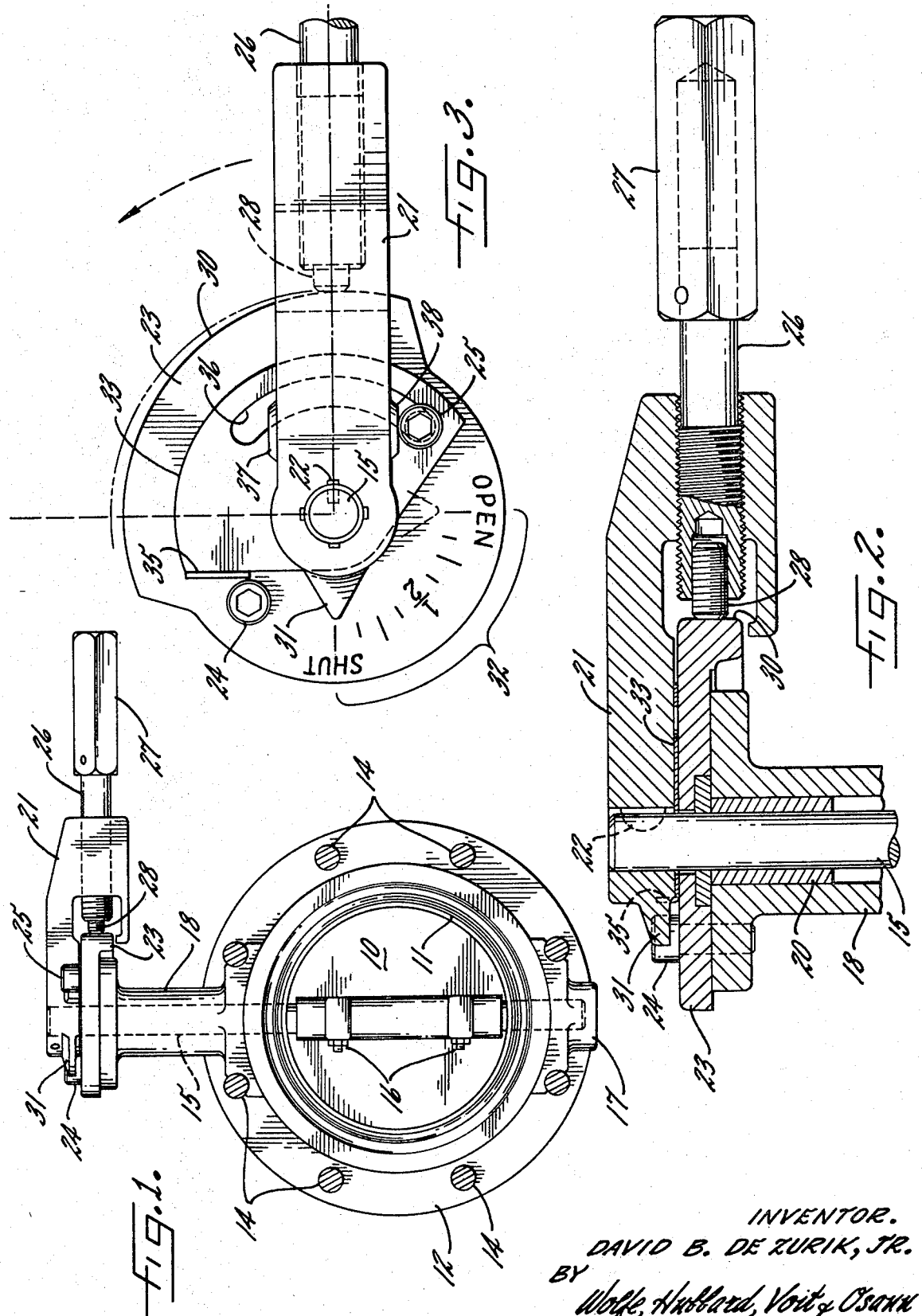
INVENTOR.
DAVID B. DE ZURIK, JR.
BY
Wolfe, Hubbard, Voit & Osann
ATTORNEYS.

ANTI SLAM VALVE POSITIONING MEANS

DESCRIPTION OF THE INVENTION

The present invention relates to valve actuating means, and in particular to means for selectively positioning the flow control element of a valve which has a tendency to close itself or slam shut under pressure. The invention is particularly adaptable for use with valves of the ball, plug or butterfly types.

The dynamic effects of fluid passing through a control valve can give rise to undesirable forces which tend to move the flow control member away from a preselected position. In the particular case of butterfly valves, it has been found that fluid flowing over the rotatable disk control member creates an airfoil effect when the control member is in its various open positions, resulting in a force which tends to close the valve if the control member is not restrained in some way. Such forces can become very great in the case of large valves and high pressures, and both the valve components and the valve actuating means must be strong enough to contend with these forces.

It is common practice to provide a locking means for securing the valve flow control member in a desired position so that flow forces will not dislodge it. However, when it is necessary to vary the position of the valve, particularly when this is done by hand, the forces must be controlled and resisted as the valve control member is moved to its new position. If not restrained in some way the valve may tend to slam closed with very undesirable consequences. Valve slam can fracture valve parts such as the disk, stem and actuating handle, and can also cause fluid hammer effects which can damage pipe lines and other associated equipment. And apart from localized damage, the unexpected closing of one valve may disrupt an entire chemical or physical process, perhaps with dangerous consequences. Finally, the force of an unrestrained valve as it slams shut can result in injury to operating personnel if they are struck by a moving actuating lever, or if the unexpected force of a slamming valve should cause them to lose balance on a catwalk or other precarious position.

In view of the foregoing, it is a principal object of the present invention to provide an improved valve positioning means for positively preventing valve slam as well as securing a valve control member in a desired position. It is a further object to provide such an apparatus which is simple, foolproof, and inexpensive to manufacture and to maintain.

In greater detail, it is intended through the invention to provide a simplified valve positioning and closing apparatus which is adaptable to all kinds of valves in which a rotary flow control member is rotatable between open and closed positions, and in which it is desired to secure the control member at any point between these limits by means of a simple manually actuated handle control. The invention provides the additional feature of safety means for preventing internal pressure forces from unexpectedly or uncontrollably forcing the control member and its handle toward the closed position.

It is further intended that the apparatus of the present invention be adaptable for use with easily visible indicia of valve position and simple stop means for preventing movement of the valve flow control member past its desired end positions.

Other objects and advantages of the invention will become apparent from reading the following detailed description and from reference to the drawings, in which:

FIG. 1 is an end elevation of an exemplary butterfly valve incorporating a positioning means constructed according to the present invention;

FIG. 2 is an enlarged fragmentary section of the improved positioning means of the valve of FIG. 1; and FIG. 3 is a plan view of the structure shown in FIG. 2.

While the invention is shown and described in connection with a particular exemplary embodiment, it should be understood that the utility and advantages of the invention are not limited thereto, but may find application wherever a positive and reliable positioning means is required for a rotatable valve element in which provision must be made to control or resist internal forces which would otherwise affect the position of the valve flow control member.

Turning to the drawings, there is shown in FIG. 1 an exemplary valve of the butterfly type in which a flow control member in the form of a rotatable disk 10 is disposed against a seating surface 11 carried by a valve body 12. The body 12 is provided with a row of holes about its circumference which receive bolts 14, used for the purpose of attaching the valve in a line between the end flanges of inlet and outlet pipes (not shown). The disk is secured to a stem 15 by means of lock pins 16 or other fasteners, and the stem 15 is journaled in the body 12 for rotation to selectively position the disk 10 at any desired position between the open and closed conditions. At its lower end, the stem 15 is journaled in a socket 17, while at its upper end, the stem 15 extends through and protrudes from a neck 18 of the valve body 12.

At its protruding end, as best shown in FIGS. 2 and 3, the stem 15 is journaled in a bushing 20, and the protruding portion is keyed to a transversely mounted actuating lever 21 by means of a key 22 mounted in suitable keyways in each member. Interposed between the actuating lever 21 and the neck 18 of the valve body 12 is a friction plate 23 which is rigidly secured to the neck 18 by means of bolts 24, 25 so that it does not move with respect to the shaft 15 or the valve disk 10.

At the end of the actuating lever 21 there is provided a depending portion having a threaded bore in which a shaft 26 is received. The shaft 26 carries at one end a grip handle 27 and at the other end a hardened dog 28 which is engageable with a locking surface 30 on the friction plate 23. By rotating the handle 27, the dog 28 may be selectively moved towards or away from the locking surface 30, and by screwing the dog 28 firmly against the locking surface 30 the actuating lever 21 may be secured in any desired rotational position between open and closed.

As a principal feature of the invention, the valve cannot be moved toward the closed position unless the handle 27 is deliberately unscrewed further after the actuating lever 21 is loosened. For this purpose the locking surface 30 of the friction plate 23 is eccentric with respect to the valve stem 15, as may be seen in FIG. 3. The locking surface 30 is provided with a progressively increasing radius between the fully open and fully closed positions of the valve disk 10 which presents interference to movement toward the closed position, while being shallow enough to allow positive locking against movement in the opening direction. Preferably, the eccentricity in radius is on the order of five thirty-seconds inch on a 3 inch radius over 90° of rotation or about 0.05 per cent per degree of rotation.

The open and closed positions are visibly indicated by the provision of a pointer 31 cooperating with inscribed indicia 32 on the actuating lever 21 and friction plate 23, respectively. Also provided to cooperate with the friction plate 23 and the actuating lever 21 is an adjustable stop 33 having an upturned tab 35 which limits the travel of the operating lever 21 in opening the valve disk 10. An elongate slot 36 is provided in the plate 33 to receive one of the bolts 25 so that this bolt may be loosened and the plate 33 rotated to bring the tab 35 into any desired position, whereby the maximum open condition of the valve may be preset. Preferably, the actuating lever 21 is provided with a raised pad 37 which contacts the stop tab 35 to determine the maximum open position, and a similar pad 38 contacts the bolt 25 in the fully closed position.

In operation, the valve is easily opened from a closed position by grasping the handle 27 and moving the actuating lever 21 counterclockwise as seen in FIG. 3. Because the eccentric portion of the locking surface 30 presents a decreasing radius when the actuating lever 21 is moved in the opening direction, the handle 27 moves easily until the proper position has been reached, preferably as determined by the stop tab 35. At this point the operator screws the handle 27 down, moving the threaded shaft 26 and dog 28 inward and into locking engagement with the locking surface 30 of the friction plate 23. The valve will remain securely locked in this position.

When it is desired to shut the valve, the handle 27 is gradually unscrewed, allowing the actuating lever 21 to be moved in a clockwise direction. It will be observed that the increasing radius of the eccentric locking surface 30 then tends to interfere with the movement of the actuating lever 21, which requires that the operator rotate the handle 27 to unscrew the threaded shaft 26 if the valve is to continue toward its closed position. The valve disk 10 is thereby prevented from slamming shut unexpectedly while allowing convenient manual operation.

I claim:

1. In a valve having a body within which a control member is rotatable for controlling the flow therethrough, said control member having a stem protruding from an opening in the body for rotation between open and closed positions, the improved position means comprising in combination:
 a friction plate carried by the valve body surrounding the stem;
 an actuating lever mounted on the stem and having adjustable locking means for engaging a locking surface of the friction plate over a path of lever movement corresponding to movement of the control member between open and closed positions; and
 which locking surface is eccentric with respect to the stem and having a progressively increasing radius from the open to the closed position.

2. Apparatus as defined in claim 1 in which the eccentricity of said locking surface is on the order of 0.05 percent per degree of actuating lever rotation.

3. Apparatus as defined in claim 1 in which said adjustable locking means includes a threaded shaft carried by the actuating lever perpendicular to the friction plate locking surface, said shaft having a tip for frictionally securing the actuating lever to the friction plate.

4. Apparatus as defined in claim 3 in which said threaded shaft has a manually rotatable grip exterior of the locking lever.

5. Apparatus as defined in claim 3 in which said friction plate and actuating lever have a pointer and cooperating indicia for indicating the relative position of the control member within the valve body.

6. Apparatus as defined in claim 5 having adjustable stop means secured to said friction plate for limiting travel of the actuating lever between open and closed positions.